United States Patent [19]
Gast

[11] Patent Number: 5,163,230
[45] Date of Patent: Nov. 17, 1992

[54] CHALK LINE APPARATUS

[76] Inventor: Raymond A. Gast, 7676 N. Meer Rd., Michigan City, Ind. 46360

[21] Appl. No.: 819,984

[22] Filed: Jan. 13, 1992

[51] Int. Cl.⁵ .............................................. G01C 15/10
[52] U.S. Cl. ...................................... 33/392; 33/276; 33/393; 33/414
[58] Field of Search ................ 33/392, 393, 394, 353, 33/413, 414, 273, 276, 283, 295, 339

[56] References Cited

U.S. PATENT DOCUMENTS

| | | | |
|---|---|---|---|
| 1,586,654 | 6/1926 | Conway | 33/414 |
| 1,784,064 | 12/1930 | Griswold | 33/393 |
| 1,876,473 | 9/1932 | Spaeth et al. | 33/414 |
| 2,376,407 | 5/1945 | Wells | 33/393 |
| 3,568,322 | 3/1971 | Showers | 33/413 |
| 3,766,659 | 10/1973 | Quenot | 33/392 |
| 4,459,761 | 7/1984 | Bosco | 33/414 |
| 4,565,011 | 1/1986 | Karger | 33/414 |
| 4,660,291 | 4/1987 | Dehn | 33/414 |
| 4,697,349 | 10/1987 | Lee | 33/414 |
| 4,773,162 | 9/1988 | Lin | 33/414 |

FOREIGN PATENT DOCUMENTS 7438122  6/1976  France ................... 33/393

Primary Examiner—Thomas B. Will
Attorney, Agent, or Firm—Leon Gilden

[57] ABSTRACT

A chalk line assembly includes a housing formed with a cavity therewith to receive powdered chalk, with a chalk line wound within the housing about a central spool. A crank handle is directed into the housing to effect winding and reeling of a chalk line relative to the housing about the spool. A mounting plate is secured to a rear wall of the housing, with the mounting plate including a ferromagnetic member mounted to the mounting plate projecting rearwardly of the mounting plate. The mounting plate further includes a support aperture directed therethrough to receive fasteners permitting vertical mounting of the apparatus to ferrous and non-ferrous supports in directing a vertical chalk line. A modification of the invention includes a fiber optic housing structure mounted to the housing for projecting illumination and alignment with the chalk line and orthogonally oriented relative to the chalk line for measurement in a construction environment.

2 Claims, 4 Drawing Sheets

PRIOR ART

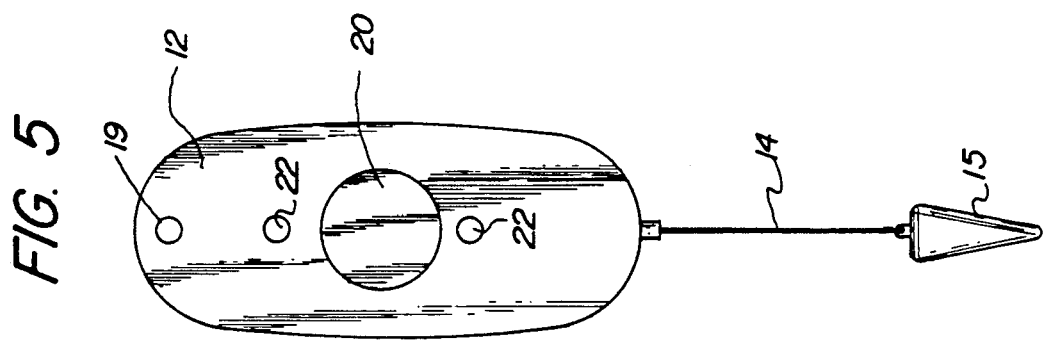
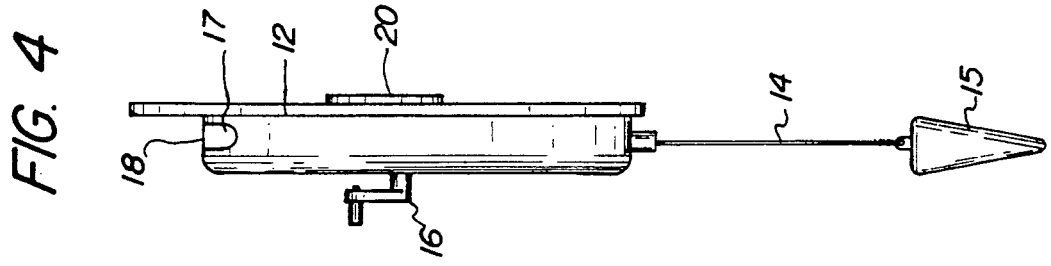
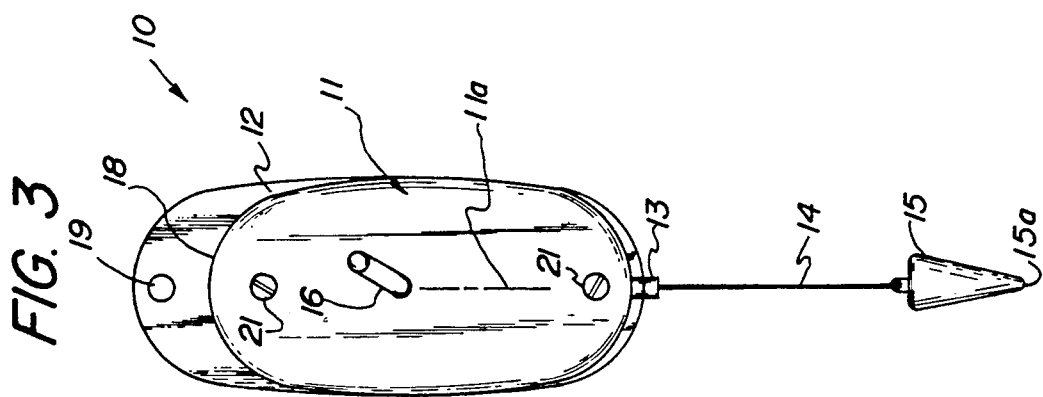

CHALK LINE APPARATUS

BACKGROUND OF THE INVENTION

1. Field of the Invention

The field of invention relates to chalk line apparatus, and more particularly pertains to a new and improved chalk line apparatus wherein the same is arranged to project linear chalk lines in association with construction measuring devices.

2. Description of the Prior Art

Chalk line apparatus of various types are utilized throughout the prior art to provide linear lines, both vertically and horizontally, for alignment of structural components prior to their assemblage in a construction environment. Such chalk line apparatus is exemplified in the U.S. Pat. No. 4,143,462 to Gertz wherein a chalk line is also arranged to function as a plumb bob in association with a hook mounted to a free distal end of the chalk line. The instant invention overcomes deficiencies of the prior art by providing fixed mounting of the housing and projection of the chalk line relative to the housing utilizing a plumb bob member thereto.

U.S. Pat. No. 3,721,009 to Lucich sets forth a chalk line holder utilizing compression rollers to minimize loss of the marking agent through the housing.

U.S. Pat. No. 4,819,337 to Noyes sets forth a further example of a chalk line device formed with a storage spool therewithin.

U.S. Pat. No. 3,662,471 to Lynde and the U.S. Pat. No. 3,888,010 to Hyde are further examples of chalk line devices utilizing chalk as a marking indicator medium.

As such, it may be appreciated that there continues to be a need for a new and improved chalk line apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of chalk line apparatus now present in the prior art, the present invention provides a chalk line apparatus wherein the same utilizes a weighted plumb bob mounted to a free distal end of a flexible chalk line for providing exact vertical measuring and indicating utilizing a chalk line apparatus. As such, the general purpose of the present invention, which will be described subsequently in greater detail, is to provide a new and improved chalk line apparatus which has all the advantages of the prior art chalk line apparatus and none of the disadvantages.

To attain this, the present invention provides a chalk line assembly including a housing formed with a cavity therewithin to receive powdered chalk, with a chalk line wound within the housing about a central spool. A crank handle is directed into the housing to effect winding and reeling of a chalk line relative to the housing about the spool. A mounting plate is secured to a rear wall of the housing, with the mounting plate including a ferromagnetic member mounted to the mounting plate projecting rearwardly of the mounting plate. The mounting plate further includes a support aperture directed therethrough to receive fasteners permitting vertical mounting of the apparatus to ferrous and non-ferrous supports in directing a vertical chalk line. A modification of the invention includes a fiber optic housing structure mounted to the housing for projecting illumination and alignment with the chalk line and orthogonally oriented relative to the chalk line for measurement in a construction environment.

My invention resides not in any one of these features, per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chalk line apparatus which has all the advantages of the prior art chalk line apparatus and none of the disadvantages.

It is another object of the present invention to provide a new and improved chalk line apparatus which may be easily and efficiently manufactured and marketed.

It is a further object of the present invention to provide a new and improved chalk line apparatus which is of a durable and reliable construction.

An even further object of the present invention is to provide a new and improved chalk line apparatus which is susceptible of a low cost of manufacture with regard to both materials and labor, and which accordingly is then susceptible of low prices of sale to the consuming public, thereby making such chalk line apparatus economically available to the buying public.

Still yet another object of the present invention is to provide a new and improved chalk line apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic front view of the instant invention.

FIG. 4 is an orthographic side view of the instant invention.

FIG. 5 is an orthographic rear view of the instant invention.

DESCRIPTION OF THE PREFERRED EMBODIMENT

Figure 1:
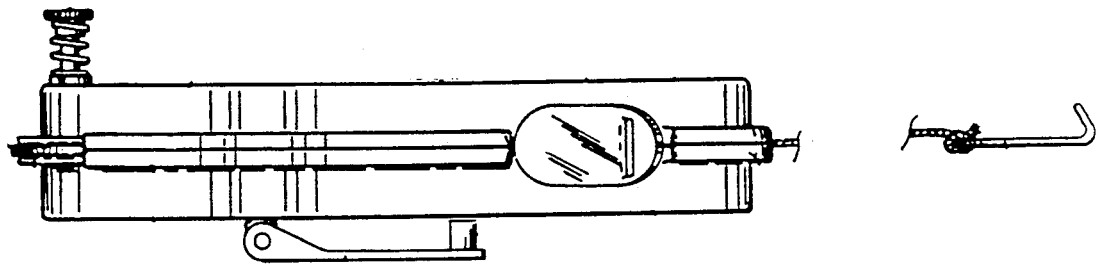
FIG. 1 is an orthographic side view of a prior art structure.

With reference now to the drawings, and in particular to FIGS. 1 to 9 thereof, a new and improved chalk line apparatus embodying the principles and concepts of the present invention and generally designated by the reference numerals 10 and 10a will be described.

Figure 2:
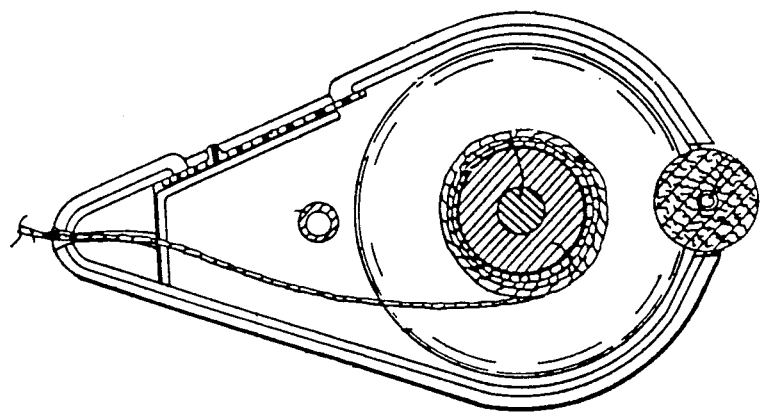
FIG. 2 is an orthographic cross-sectional illustration of the prior art structure as set forth in FIG. 1.
Figure 7:
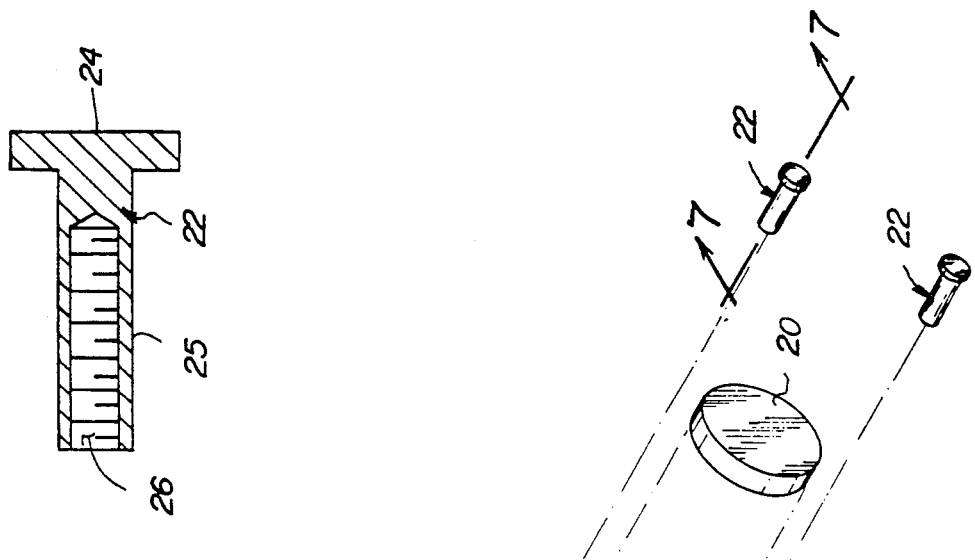
FIG. 7 is an orthographic view, taken along the lines 7—7 of FIG. 6 in the direction indicated by the arrows.
Figure 6:
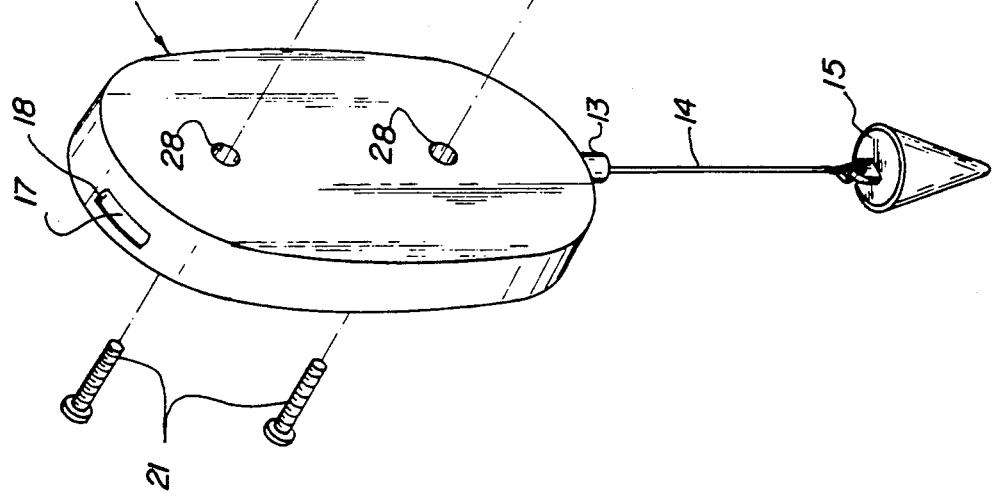
FIG. 6 is an isometric exploded illustration of the invention.

The FIGS. 1 and 2 illustrate a prior art chalk line structure as set forth in the U.S. Pat. No. 4,143,462 to Gertz incorporated herein by reference to illustrate the mounting of a chalk line about a winding spool utilizing a projecting flexible chalk line member directed from the housing through a lower distal end of the chalk line housing, to illustrate the conventional use of a crank handle to permit the winding and reeling of the chalk lien relative to the housing within the cavity that is typically filled with a chalk medium for marking purposes.

More specifically, the chalk line apparatus 10 of the instant invention essentially comprises a polymeric housing 11 formed with a cavity therewithin for receiving a marking indicator chalk medium through a slide plate 17 directed through a side wall of the housing 11, with the slide plate 17 including a slide plate handle 18 to permit ease of grasping and displacement of the slide plate relative to the housing 11 to effect filling of the cavity. A crank handle 16 is orthogonally directed through a front wall of the housing 11 rotatably mounting a winding spool therewithin to secure a predetermined length of flexible chalk line 14 within the medium, in a manner as set forth in the U.S. Pat. No. 4,143,462. The housing 11 includes a mounting plate 12 mounted contiguously to the polymeric housing 11 to a rear surface thereof extending above the housing 11, including a mounting bore 19 directed through the mounting plate 12 above the housing 11 aligned with a major axis 11a of the housing 11. An outlet conduit 13 aligned with the axis 11a is directed through the housing 11 at a lower distal end thereof to provide for minimized abrasion of the chalk line 14 when directed from the housing. The chalk line 14 includes an inverted conical plumb bob member 15 mounted to a free distal end of the chalk line 14, with the plumb bob 15 including a conical indicator tip 15a formed at a lower distal end of the plumb bob 15 coaxially aligned with the chalk line 14 and the plumb bob 15 for precision indicating to a reference point as utilized in the construction trade.

A ferromagnetic member 20 (see FIGS. 5 and 6) is mounted within a magnet receiving cavity 23 directed through a rear surface of the mounting plate 12, with the magnet member 20 projecting beyond the rear surface of the mounting plate for permitting securement of the mounting plate and the apparatus to a ferrous support structure, such as a mounting beam and the like. The mounting bore 19 permits alternative positioning of the apparatus about any convenient fastener such as a nail for positioning the housing 11, as required.

A plurality of fasteners 21 are directed through coaxially aligned mounting plate bores 27 with associated housing bores 28 to secure the housing 11 and the mounting plate 12 together. Each fastener 21 is received within a fastener receiving plug 22. Each fastener receiving plug 22 includes a plug head 24 formed with a cylindrical body 25 projecting through the mounting plate bore 27 and the housing bore 28 to fixedly align the apparatus components together, with the internally threaded bore 26 receiving a fastener 21. The plug head 24 accordingly in association with a fastener head of each fastener 21 secures the housing 11 and the plate 12 therebetween.

Figure 8:
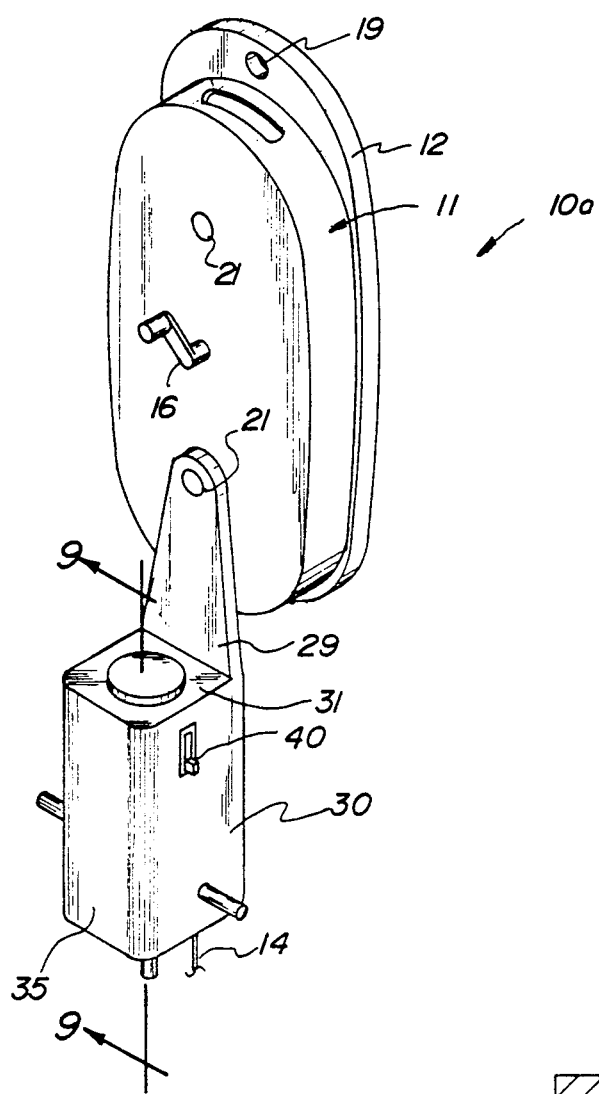
FIG. 8 is an isometric illustration of a modification of the invention.
Figure 9:
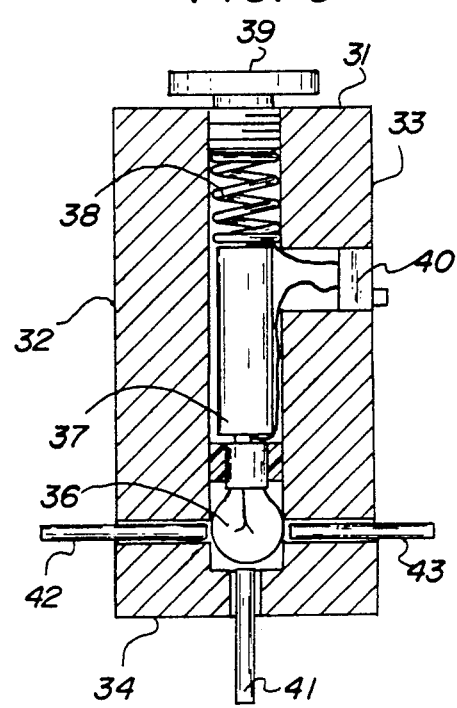
FIG. 9 is an orthographic view, taken along the lines 9—9 of FIG. 8 in the direction indicated by the arrows.

The apparatus 10a, as illustrated in FIGS. 8 and 9, further includes a support flange 29 oriented parallel to the mounting plate 12 and secured adjacent its upper distal end to a lowermost fastener 21, with the support flange 29 projecting below the housing 11 securing a flange housing 30 thereto. The flange housing includes a housing top wall 31 spaced from and parallel a housing bottom wall 34. Parallel housing first and second side walls 32 and 33 are orthogonally directed between the top and bottom walls 31 and 34. A housing front wall 35 extends between the top and bottom walls as illustrated. The flange housing 30 is positioned forwardly of and arranged with its longitudinal axis (not shown) parallel relative to the major axis 11a for alignment of a first fiber optic cable 41 directed through the bottom wall 34. The first fiber optic cable 41 is arranged to orthogonally project through the bottom wall 34, wherein respective second and third fiber optic cables 42 and 43 that are coaxially aligned relative to one another project through the respective first and second side walls 32 and 33 orthogonally oriented relative to the respective first and second side walls. An illumination bulb 36 is positioned at an intersection defined within the respective first, second, and third fiber optic cables within the housing 30, with the bulb 36 coaxially aligned with the battery 37 that is directed against the bulb 36 by a battery spring 38. The battery spring 38 is captured between a plug member 39 directed through the top wall 31 and the bulb 36. Removal of the plug member 39 permits access to the components within the housing for servicing thereof. An on/off switch 40 directed through the second side wall 33 effects selective illumination of he bulb 36. In this manner, a reference line 41 directed from projection of illumination of a lower distal end of the first fiber optic cable 41 provides a reference and check line for the chalk line 14 to be utilized in lieu thereof or in combination therewith for checking of the chalk line subsequent to its use. Further, the second and third fiber optic cables 42 and 43 permit the use of orthogonally oriented reference lines to be projected therefrom providing convenient and rapid projection of such construction lines for reference use relative to the primary chalk line 14.

As to the manner of usage and operation of the instant invention, the same should be apparent from the above disclosure, and accordingly no further discussion relative to the manner of usage and operation of the instant invention shall be provided.

With respect to the above description the, it is to be realized that the optimum dimensional relationships for the parts of the invention, to include variations in size, materials, shape, form function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A chalk line apparatus, comprising,
   a polymeric housing, the polymeric housing including a major axis directed longitudinally of and medially of the polymeric housing, the polymeric housing including a front wall and a rear wall, the rear wall including a mounting plate contiguously mounted to the rear wall extending above the polymeric housing, the mounting plate including a mounting bore directed through the mounting plate above the polymeric housing aligned with the major axis, and
   a rigid outlet conduit directed through a lower distal end of the polymeric housing coaxially aligned with the major axis, with a flexible chalk line slidably directed through the outlet conduit, and a crank handle directed through the front wall to effect winding and reeling of the chalk line within the polymeric housing, and
   an inverted conical plumb bob mounted to a free distal end of the flexible chalk line, the conical plumb bob including an indicator tip coaxially aligned with the major axis and the chalk line and the plumb bob, wherein the polymeric housing is vertically oriented, and
   the mounting plate includes a magnet receiving cavity directed through a rear surface of the mounting plate spaced from the rear wall of the polymeric housing, and a ferromagnetic member fixedly and complementarily received within the magnet receiving cavity, with the ferromagnetic member projecting beyond the mounting plate for securement to a ferrous support component, and
   the polymeric housing includes at least one housing bore orthogonally directed through the front wall and the rear wall of the polymeric housing, and at least one mounting plate bore orthogonally directed through the mounting plate, wherein the mounting plate bore and the housing bore are coaxially aligned, and a receiving plug directed through the mounting plate bore and the housing bore, the receiving plug including a head member projecting beyond the mounting plate, and the receiving plug further including a cylindrical body projecting through the mounting plate bore and the housing bore, the cylindrical body including an internally threaded bore directed therethrough, and a fastener directed through the polymeric housing orthogonally through the front wall, with the fastener received within the internally threaded bore to secure the polymeric housing and the mounting plate together.

2. An apparatus as set forth in claim 1 including a support flange, the support flange including the fastener orthogonally directed therethrough, with the support flange mounted in contiguous communication with the front wall of the polymeric housing, the support flange including a flange housing fixedly mounted to a lower distal end of the support flange, the flange housing including a flange housing top wall orthogonally oriented relative to the support flange, and the flange housing further including a first side wall spaced from and parallel a second side wall, wherein the first side wall and the second side wall are orthogonally oriented relative to the flange housing top wall, and a flange housing bottom wall spaced from and parallel the flange housing top wall, and a plug member directed through the top wall, and a battery member positioned within the flange housing below the plug member, with the battery orthogonally oriented relative to the flange housing top wall, and a battery spring captured between the plug member and the battery member, and an illumination bulb mounted in electrical communication with a forward distal end of the battery member, and an on/off switch in electrical communication with the illumination bulb and the battery member to effect selective illumination of the illumination bulb, and a first fiber optic cable positioned adjacent the illumination bulb and projecting orthogonally through the flange housing bottom wall, wherein the first fiber optic cable is arranged in a parallel spaced relationship relative to the major axis, and a second fiber optic cable orthogonally projecting through the first side wall positioned adjacent the illumination bulb, and a third fiber optic cable projecting orthogonally through the second side wall positioned adjacent the illumination bulb, with the second fiber optic cable and the third fiber optic cable arranged in coaxial alignment relative to one another, and the first fiber optic cable arranged orthogonally relative to the second fiber optic cable and the third fiber optic cable.

* * * * *